(12) United States Patent
Satchell, Jr. et al.

(10) Patent No.: US 6,250,915 B1
(45) Date of Patent: Jun. 26, 2001

(54) BURNER AND COMBUSTION METHOD FOR HEATING SURFACES SUSCEPTIBLE TO OXIDATION OR REDUCTION

(75) Inventors: Donald Prentice Satchell, Jr., Berkeley Heights, NJ (US); Neil George Simpson, Sylvania, OH (US); Andrew Peter Richardson, Clinton, NJ (US)

(73) Assignee: The BOC Group, Inc., New Providence, NJ (US)

( * ) Notice: Subject to any disclaimer, the term of this patent is extended or adjusted under 35 U.S.C. 154(b) by 0 days.

(21) Appl. No.: 09/538,021

(22) Filed: Mar. 29, 2000

(51) Int. Cl.$^7$ .......................................... F27D 7/00
(52) U.S. Cl. ................... 432/19; 432/20; 431/8; 431/187
(58) Field of Search ................ 432/13, 19, 20, 432/22; 431/8, 10, 187

(56) References Cited

U.S. PATENT DOCUMENTS

| | | | |
|---|---|---|---|
| 4,297,093 | * | 10/1981 | Morimoto et al. ................ 431/8 |
| 5,145,361 | * | 9/1992 | Kurzinski ........................... 432/19 |
| 5,242,296 | * | 9/1993 | Tuson et al. ........................ 431/10 |
| 5,871,343 | * | 2/1999 | Baukal, Jr. et al. ................ 431/8 |
| 5,904,475 | * | 5/1999 | Ding ................................... 431/8 |
| 6,171,100 | * | 1/2001 | Joshi et al. ......................... 431/186 |

* cited by examiner

Primary Examiner—Gregory Wilson
(74) Attorney, Agent, or Firm—Joshua L. Cohen; Salvatore P. Pace

(57) ABSTRACT

A method of heating a surface provides for a central fuel rich jet having a peripheral shroud of substantially stoichiometric combustion products and one or more fuel lean jets each having a peripheral shroud of substantially stoichiometric combustion products. The fuel lean jets are placed around the periphery of the central fuel rich jet. The fuel lean jet or jets each having shrouds of substantially stoichiometric combustion products and a careful choice of relative velocities for each results in minimizing the mixing of the fuel rich and fuel lean jets until they are at or near the surface of the material to be melted. The placement of the fuel lean jet and fuel rich jets may be reversed in applications where an oxidizing atmosphere is required at the surface to be heated.

43 Claims, 3 Drawing Sheets

BURNER AND COMBUSTION METHOD FOR HEATING SURFACES SUSCEPTIBLE TO OXIDATION OR REDUCTION

BACKGROUND OF THE INVENTION

This invention relates to an improved burner and combustion method for use in the melting of glass, metals or other materials. More specifically, this invention relates to a burner and combustion method whereby hot, nearby, and substantially parallel fuel-rich and fuel-lean (oxidant-rich) jets efficiently transport fuel and oxidant to the surface of a material to be heated or melted by direct flame impingement. The method enables one to modify the flow so that either an oxidizing or reducing atmosphere is present at the surface.

The heating and melting of materials such as glass cullet and batch, scrap metal, minerals and ores is important in many industries. Typically, each process has a heat input requirement, a heat distribution requirement and geometrical constraints which hinder the proper placement of a burner and often require the placement of a burner at a much greater distance from the material to be heated or melted than is optimal.

In addition, there are often chemical stability issues relative to heating materials. For example, direct flame impingement on iron or steel usually produces an undesirable oxide coating or oxide slag layer upon melting. Therefore, one would like to heat iron and steel with a reducing gas in contact with the solid or molten iron to minimize oxidation. Other examples of surfaces susceptible to oxidation or reduction include glass forming materials, aluminum, copper, metal alloys, lead, zinc, frit materials, or ceramic materials.

U.S. Pat. No. 5,139,558 to Lauwers discloses the use of oxy-fuel burners located on the furnace roof and aimed at the interface between the batch and the melt in order to increase the melting rate of the glass and to prevent batch materials from entering the upstream zone. However, because the furnace roof to glass melt distance is often greater than typical $O_2$-fuel flame length, the thermal efficiency of the process is not adequate for use outside of regenerative or recuperative furnaces.

U.S. Pat. No. 5,643,348 to Shamp et. al attempts to overcome this problem by injecting oxygen and fuel at separate points and producing a large combustion "flame cloud" in the center of the furnace. This approach eliminates the oxy-fuel flame length limitation, but suffers from a safety problem. Where there is no apparent method to maintain reliable ignition of the fuel and oxidant this process could lead to explosions in applications where the ambient conditions are below the autoignition temperature. In addition, the cold fuel or oxidant jet could cause material to solidify and block the nozzle. With fuel-rich and fuel-lean flames of the present invention, the flame propagates back to the inlet nozzle, which keeps the nozzle clear and provides sufficient heat along the entire path of the fuel-rich or fuel-lean flame for ignition.

In U.S. Pat. No. 5,387,100 to Kobayashi the use of rich and lean fuel streams to reduce $NO_x$ emissions is disclosed, however, there is no teaching regarding the interacting of fuel-rich and fuel-lean flames or jets to increase the transfer of heat to the batch or melt. Kobayashi teaches forming fuel-rich and fuel-lean flames, allowing radiation to lower the flame temperature and then allowing the cooler flames to interact without contacting a surface to complete combustion at a lower temperature thereby decreasing $NO_x$ emission. In contrast, in the present invention, radiant losses are minimized prior to interaction with the surface to be heated.

U.S. Pat. No. 5,267,850 to Kobayashi et al. teaches the use of a fuel staged burner to keep the burner cooler. This invention uses similar equipment to produce a fuel rich jet adjacent to fuel lean jet or jets.

U.S. Pat. No. 5,100,313 to Anderson et al. teaches an approach to produce a hot oxygen jet. This oxygen jet is generally used to remove carbon from molten iron to produce steel.

Commonly assigned U.S. patent application Ser. No. 09/384,065 teaches the generation of fuel-rich and fuel-lean flames from separate burners. The flames then interact in gas space in the vicinity of a surface to more efficiently transfer heat to the surface.

The present invention teaches the generation of substantially parallel fuel-rich and fuel-lean jets from a single burner assembly to minimize energy loss during transport through the gas space. The fuel rich and fuel lean jets mix upon collision with a surface to produce a flame adjacent to the surface and provide a shield gas for the surface.

The ability to generate the fuel rich and fuel lean jets from a single burner assembly offers significant advantages over the prior art practice of introducing fuel rich and fuel lean flames from separate sources. Firstly, with separate sources the separate flames, the fuel rich and fuel lean jets, must intersect proximate to the surface to be heated. In the present invention the streams are substantially parallel thus relieving the fixed constraint of burner arrangement with burner to surface distance. This is of importance in situations where the surface of the material to be heated or melted varies. Secondly, the separate fuel rich and fuel lean streams need to intersect at distinct points, therefore, the burners need to be located at defined locations. These locations may be unavailable due to pre-existing structural constraints. The present invention removes the importance of these structural constraints. Thirdly, the alignment of multiple burners to generate intersecting flames at a defined point is difficult. The use of a single burner assembly removes that need.

Therefore, there is a clear and long-standing need for a burner and heating method that would enable one to maximize the amount of heat transferred to a surface of a material to be heated or melted in a variety of furnace geometries while allowing control of the reducing or oxidizing components present at the surface.

SUMMARY OF THE INVENTION

Accordingly, the present invention increases the amount of heat transferred to the surface of a material to be heated or melted in an industrial furnace by using a burner assembly having burner elements capable of producing fuel rich and fuel lean jets having shrouds of substantially stoichiometric combustion products and by contacting the surface with the fuel rich and fuel lean jets to form a flame at or near the surface.

The method can be used to heat the surface of materials susceptible to oxidation by generating a primary fuel stream as the core of the fuel rich jet, generating an annular secondary oxygen stream around the primary fuel stream to generate the shroud of substantially stoichiometric combustion products at the periphery of the fuel rich jet. A plurality of primary oxygen streams around the periphery of the fuel rich jet each primary oxygen stream provides a core for each of the fuel lean jets and an annular secondary fuel stream around each of the primary oxygen streams generates the shroud of substantially stoichiometric combustion products at the periphery of each of the fuel lean jets.

Alternatively, generating the fuel rich jet can be accomplished by generating a primary fuel stream as the core of the fuel rich jet and generating an annular secondary oxygen stream around the primary fuel stream to generate the shroud of substantially stoichiometric combustion products at the periphery of the fuel rich jet. The fuel lean jet is generated as an annular primary oxygen stream around the periphery of the fuel rich jet and an annular secondary fuel stream around the periphery of the primary oxygen stream to generate the shroud of substantially stochiometric combustion products at the periphery of the fuel lean jet.

For use in heating the surface of a material susceptible to reduction a primary oxygen stream is generated as the core of a fuel lean jet and an annular secondary fuel stream is generated around the primary oxygen stream to generate the shroud of substantially stoichiometric combustion products at the periphery of the fuel lean jet. A plurality of primary fuel streams are generated as the core of a plurality of fuel rich jets around the periphery of the fuel lean jet with an annular secondary oxygen stream generated around each of the primary fuel streams to create the shroud of substantially stoichiometric combustion products at the periphery of each of the fuel rich jets.

Alternatively, an annular primary fuel stream as the core of the fuel rich jet is generated around the periphery of the fuel lean jet with an annular secondary oxygen stream around the periphery of the annular primary fuel stream necessary to generate a shroud of substantially stochiometric combustion products at the periphery of the fuel rich jet.

Diverting a portion of either or both of the primary oxygen stream or the primary fuel stream generates a lower velocity oxygen stream or fuel stream increasing the ability to generate a shroud of substantially stoichiometric combustion products at the periphery of the fuel rich and fuel lean jets.

The axis of at the fuel lean jet or jets could diverge from the axis of the fuel rich jet by a divergence angle of not more than ten degrees. A cavity can also be used to focus the fuel rich and fuel lean jets. A portion of the cavity could diverge by not more than 20 degrees.

A further object of the invention is to operate the jets at an adiabatic temperature of the fuel rich and fuel lean jets of at least 800° C. so as to insure combustion at or near the surface of the material to be heated or melted without the need for a supplemental ignition source.

A burner assembly for use in the method of the present invention includes a central conduit and a first annular conduit around the central conduit for producing a first fuel rich or fuel lean jet said jet having a peripheral shroud of substantially stoichiometric combustion products. Either a plurality of second burner elements located around the periphery of the first burner element, each having a central conduit and an annular conduit, or an annular burner element located around the periphery of the first burner having a first annular and a second annular conduit produces the fuel lean or fuel rich jet having a peripheral shroud of substantially stoichiometric combustion products.

The utilization of fuel rich and lean jets limits radiant energy losses from the aforementioned streams thus maximizing the heat delivered to the surface of the material to be heated. The generation of a shroud of combustion products at the periphery of the jets and a careful matching of velocities of the jets minimizes the interaction of the rich and lean streams prior to their reaching the surface. The interaction of these jets, with the surface to be heated, completes contacting of the fuel-rich and fuel-lean jets to produce a high temperature flame adjacent to the surface. Intimate contact of a shroud gas and flame with surface achieves high heat transfer efficiency with substantial control of the gas properties in contact with the surface to be heated. The geometry of the hot fuel-rich and fuel-lean jets and their orientation relative to the surface is advantageously used to optimize the heat transfer rate and the oxidation potential of the gas in contact with the surface.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings, FIG. 1 a diagrammatic representation of the gas streams exiting a burner according to the present invention.

DETAILED DESCRIPTION OF THE INVENTION

Figure 1:
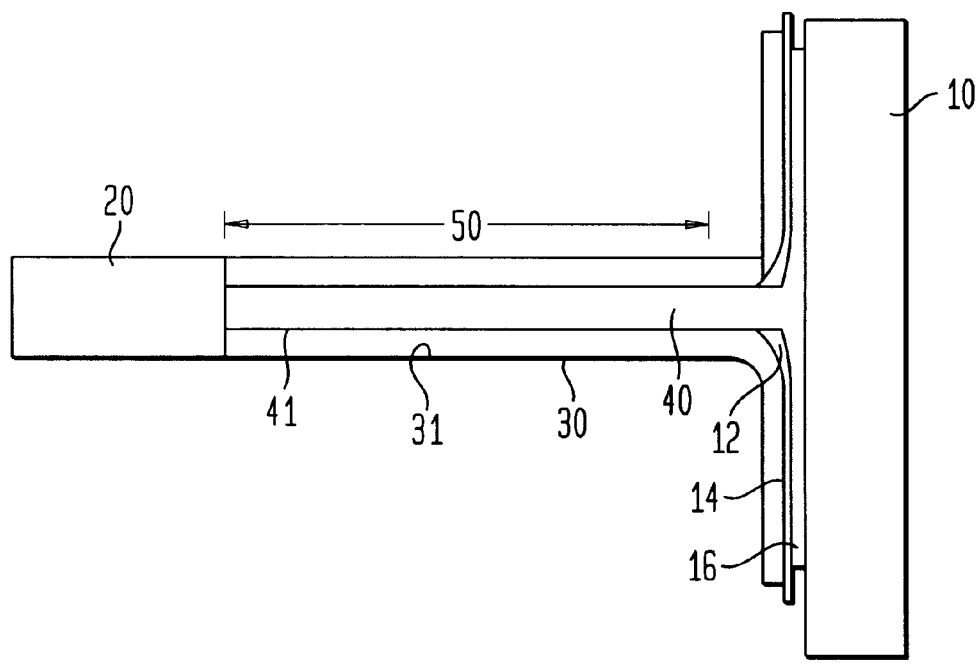

With reference to FIG. 1, burner assembly 20 produces a fuel rich jet 40 and one or more fuel lean jets 30 around the periphery of the central fuel rich jet 40. Zone 50 along the axis of the fuel rich jet 40 is the zone in which mixing is minimized so that the primary location of jet mixing occurs at approximately zone 12 creating a combustion zone 14 at or above the fuel rich surface 16 of the material to be heated or melted 10. This will result in a fuel rich or non-oxidizing atmosphere being present immediately adjacent the surface 16. If a fuel lean or reducing atmosphere is desired, such as in cases where the material to be heated or melted is susceptible to reduction, the fuel rich jet 40 can be made into a fuel lean jet which is then surrounded by one or more fuel rich jets.

Central fuel rich jet 40 and fuel lean jets 30 are substantially parallel and each jet has a shroud 41 and 31 respectively which comprise substantially stochiometric combustion products. The equivalence ratio is defined as the ratio of the actual fuel-oxidant ratio (F/O) to the fuel-oxidant ratio for a stoichiometric process $(F/O)_{st}$, that is one in which all products are in their most stable form with regard to the reactants. The stoichiometric reaction being defined as the unique reaction in which all the reactants are consumed. Given, $$\frac{F}{O} = \frac{\text{mass of fuel}}{\text{mass of oxidant}},$$

then the equivalence ratio (r) is:

$$r = \frac{\left(\frac{F}{O}\right)}{\left(\frac{F}{O}\right)_{st}}$$

For stoichiometric conditions r=1
For fuel-lean conditions r<1, i.e. there is surplus of oxidant to the stoichiometric reaction requirement. For fuel-rich conditions r>1, i.e. there is a surplus of fuel to the stoichiometric reaction requirement.

Figure 2:
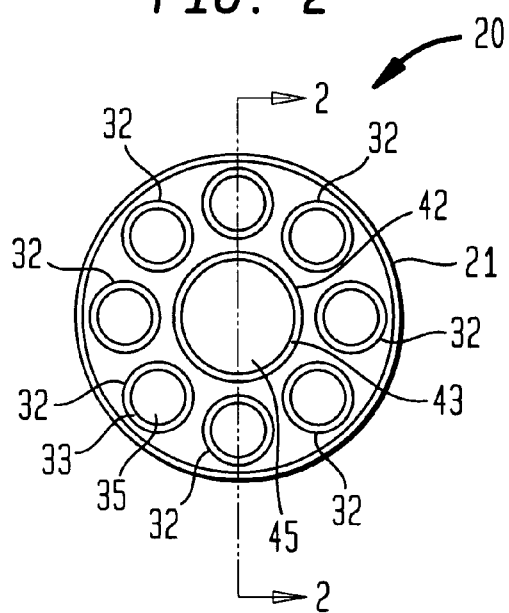
FIG. 2 is a plan view of the exit end of a burner according to the present invention.
Figure 3:
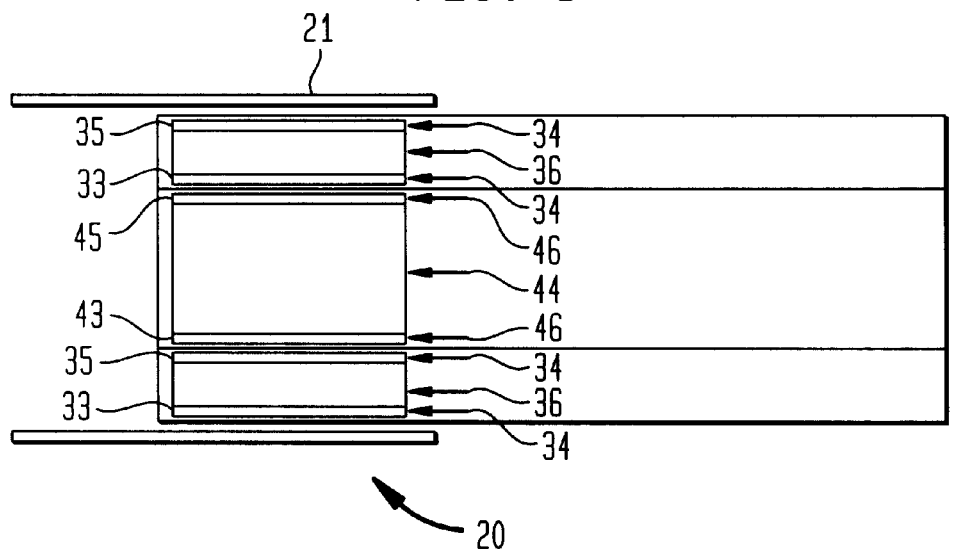
FIG. 3 is a cross-sectional view of the burner of FIG. 2 through line 2—2.

FIGS. 2 and 3 depict one embodiment of a burner assembly 20 according to the present invention having a substantially cylindrical external wall 21 in which a central burner element 42 produces the fuel rich jet from a combination of primary fuel stream 44 and secondary oxygen stream 46. Secondary oxygen stream 46 surrounds primary fuel stream 44 which is the core of the fuel rich jet. The mixing of the primary fuel stream 44 and the secondary oxygen stream 46 produces the shroud 41 of substantially stoichiometric combustion products at the periphery of fuel rich jet 40. Secondary oxygen stream 46 is provided in an annular cavity defined by annular conduit 43 surrounding the central cavity defined by central conduit 45 in the which primary fuel stream 44 is carried. The secondary oxygen stream 46 should have a substantially lower velocity than the primary fuel stream 44. The higher velocity primary fuel stream 44 would generally be greater than approximately 100 feet per second and the lower velocity secondary oxygen stream 46 would generally be less than 70% of the higher velocity primary fuel stream 44. This results in an shroud 41 of combustion gases at the periphery of the fuel rich jet 40. The shroud 41 heats the higher velocity primary fuel stream 44 to a lesser degree than were the overall mixture in the primary fuel stream 44 and secondary oxygen stream 46 stoichiometric. The reduction in temperatures effectively controls radiation heat losses.

Continuing with FIGS. 2 and 3, a plurality of fuel lean jets 30 around the periphery of fuel rich jet 40 are produced by a plurality of fuel lean burner elements 32 each producing hot fuel lean combustion products from primary oxygen stream 36 and secondary fuel stream 34. Each fuel lean jet 30 has at its core a central primary oxygen stream 36 surrounded by a secondary fuel stream 34 in which the primary oxygen stream 36 has a higher velocity than the secondary fuel stream 34 resulting in a shroud 31 of substantially stochiometric combustion products at the periphery of each fuel lean jet 30. The secondary fuel stream 34 flows through an annular cavity defined by an annular conduit 33 surrounding the primary oxygen stream 36 which flows through a central conduit 35. The higher velocity primary oxygen stream 36 would generally be greater than approximately 100 feet per second and the lower velocity secondary fuel stream 34 would generally be less than 70% of the higher velocity primary oxygen stream 36. As with the jet produced by the central fuel rich burner element 42, the off stoichiometric nature of the combination of the primary oxygen stream 36 and the secondary fuel stream 34 limits the temperature of each fuel lean jet. The number of individual jets is limited by physical geometry, however, the greater number of jets which can be placed around the periphery of the central fuel rich jet the better.

The interaction of the fuel lean jet or jets 30 around the periphery of the fuel rich jet 40 is minimized by having a substantially parallel axes for the jets, having little or no velocity difference between the individual combustion gas shrouds surrounding each jet and optimizing the depth of the surrounding burner cavity. The depth of the surrounding burner cavity should be between 0 and 7 times the diameter of the burner assembly 20.

Figure 4A:
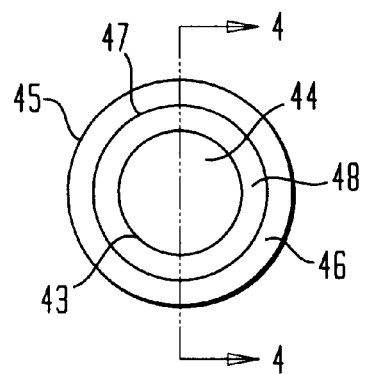
FIG. 4a is a plan view of a preferred embodiment of the burner element used to provide the central fuel rich jet.
Figure 4B:
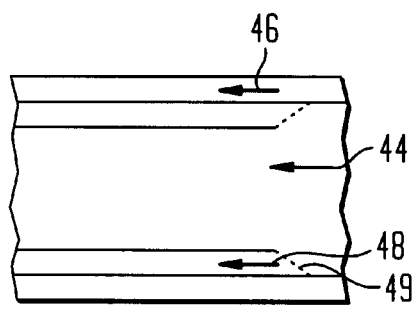
FIG. 4b is a cross-sectional view of the burner element of FIG. 4a through line 4—4.

FIGS. 4a and 4b show a preferred approach for the production of the central fuel rich jet 40 and/or one or more of the peripheral fuel lean jets 30 using a burner element. A portion of the primary fuel stream 44 is used to create a lower-velocity fuel stream 48 in an annular space around the primary fuel stream 44 but inside the annular space in which the secondary oxygen stream 46 flows. A flow control orifice 49 is used to produce the lower-velocity fuel stream 48 which flows in an annular conduit 47. In a preferred embodiment the flow control orifice 49 is a section of the annular conduit with a restricted cross-sectional area such that the velocity of fluid in the annular conduit 47 is reduced by the factor of the cross sectional area of the conduit divided by the cross section area of the orifice. This type of intermediate annular conduit can be used between any of the higher velocity and lower velocity fuel and oxidant streams in order to create a lower velocity stream of one or the other. This will aide in producing the shroud of substantially stoichiometric combustion products and will reduce mixing of the shroud and the core of the fuel rich or fuel lean jets.

The overall oxygen feed rate through the burner is between 0.9 and 1.1 of the stoichiometric value. The fuel and oxygen would be distributed to the fuel rich jet 40 and the fuel lean jets 30 such that the theoretical adiabatic flame temperature for the fuel-rich and fuel-lean jets are roughly equal. The fuel-rich and fuel-lean theoretical flame temperatures would be between approximately 800° C. and 1600° C.

Figure 5:
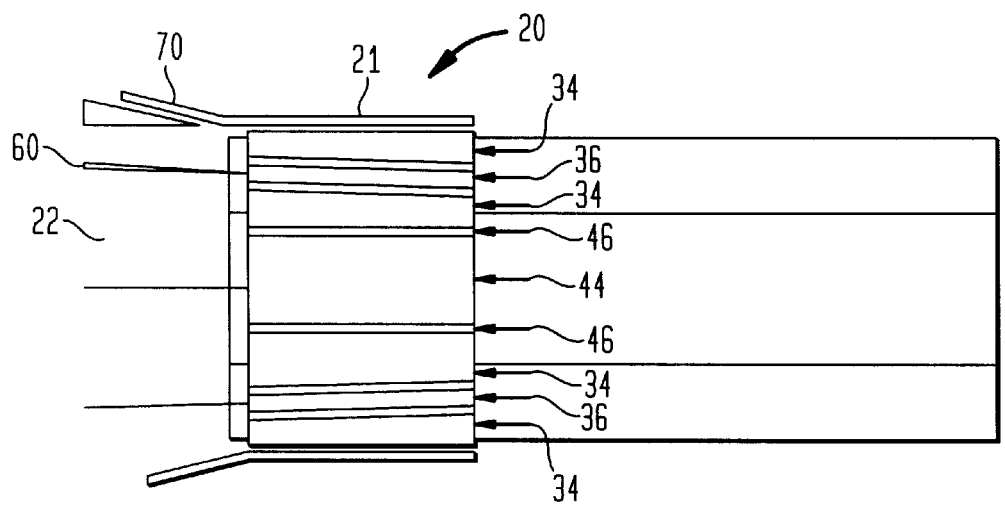
FIG. 5 is a cross-sectional view of a further embodiment of the present invention having angled fuel lean jets and an angled cavity.

FIG. 5 depicts a further embodiment of the present invention in which the fuel lean jets 30 are angled to diverge from the central fuel rich jet 40 to decrease the interaction between the fuel rich and fuel lean jets. The angle of divergence 60, i.e., the angle between the axes of the respective jets should be less than approximately 10 degrees. The cavity wall 21 of burner assembly 20 is also angled to have a cavity divergence angle 70 of less than 20 degrees from the axis of the central fuel rich jet 40. If the fuel lean jets 30 are angled then the cavity wall 21 should also be angled. With the use of the angled divergent fuel lean jets 30 and/or the use of an angled burner cavity, the velocity of the central fuel rich jet can be advantageously increased to up to approximately twice the velocity of the fuel lean jets 30.

Figure 6:
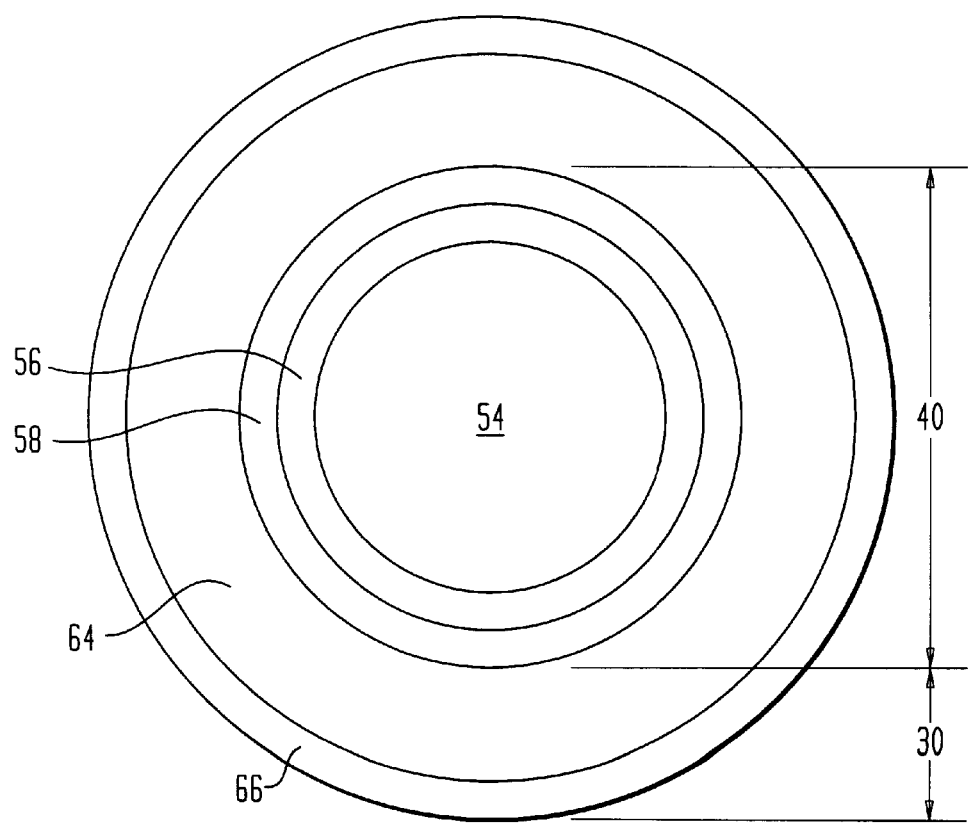
FIG. 6 is a plan view of a further embodiment of the present invention having annular cavities for the production of both the fuel rich and fuel lean jets.

FIG. 6 is a plan view diagram of a further embodiment of the present invention in which the fuel rich and fuel lean jets are generated by a plurality of concentric annular conduits. Central conduit 54 can provide either a primary fuel stream or a primary oxygen stream. In the case that a primary fuel stream is used then an optional annular conduit 56 can provide an optional intermediate fuel stream, preferably a lower velocity fuel stream diverted from the primary fuel stream. In this manner, the optional intermediate fuel stream in conduit 56 mixes with the secondary oxygen stream in annular conduit 58 to produce substantially stoichiometric combustion products. Without using the optional intermediate fuel stream and conduit 56, the primary fuel stream in conduit 54 mixes with the secondary oxygen stream in conduit 58 to generate fuel rich jet 40. Annular conduit 64 is used to generate a primary oxidant stream which mixes with secondary fuel stream 64 to generate an annular fuel lean jet 30 having a shroud of substantially stoichiometric combustion products at its periphery.

The preferred fuel for the burner described herein would be any of a number of gaseous fuels including natural gas ($CH_4$), town gas, up to $C_5$ gaseous hydrocarbons, liquid fuels such as fuel oil, naphtha, and powdered solids such as coal or petroleum coke in a carrier gas such as natural gas. Solid fuels would need to be ground to a particulate size distribution that would be appropriate for dilute phase transport with a natural gas carrier at the velocities described herein. Liquid fuels would likely require the use of an atomizer of which several are well-known in the art.

The burner described herein could also be used to provide efficient heat transfer over various distances in applications where an oxidizing gas is needed at the surface of the material to be melted such as colored glass. In such an application, the fuel and oxygen streams in the burner of FIG. 6 described above can be inverted in order to create a burner assembly 20 which can be used where a oxidizing atmosphere is necessary at the surface to be heated. Conduit 54 would be used to generate a primary oxygen stream. Conduit 56 would be used to produce an optional lower velocity intermediate oxygen stream. One or the other would mix with a secondary fuel stream in annular conduit 58 to generate a shroud of substantially stoichiometric combustion products at the periphery of the central fuel lean jet. Annular conduit 64 would then provide a means for carrying a primary fuel stream which is surrounded by secondary oxygen streams in annular conduit 66 thus producing a fuel rich jet rather than a fuel lean jet. The fuel rich jet would have a shroud of substantially stoichiometric combustion products at its periphery due to the mixing of the primary fuel stream in annular conduit 64 and the secondary oxygen stream in annular conduit 66.

Likewise, the oxygen and fuel streams in any of the embodiments may be substituted for one another. A central oxygen rich (fuel lean) jet would be surrounded by a plurality of central oxygen lean (fuel rich) jets. This type of burner would require the use of a gaseous fuel such as natural gas, synthesis gas or vaporized liquefied petroleum gas (LPG), gasoline, kerosene, or vaporized light fuel oil.

In this application the term oxygen is used to mean an oxidant gas having approximately 70 percent to 100 percent oxygen with the remainder being one or more of the gases present in air.

It will be apparent to those skilled in the art that various modifications and variations can be made to the structure and methodology of the present invention without departing from the scope or spirit of the invention. In view of the foregoing, it is intended that the present invention cover modifications and variations of this invention provided they fall within the scope of the following claims and their equivalents.

We claim:

1. A method for heating a surface susceptible to oxidation or reduction comprising the steps of:
   generating substantially parallel fuel rich and fuel lean jets, each jet having a shroud of Substantially stoichiometric combustion products to minimize mixing between the substantially parallel fuel rich and fuel lean jets; and
   contacting said surface with said substantially parallel fuel rich and fuel lean jets thereby forming a flame at or near said surface;
   wherein said step of generating substantially parallel fuel rich and fuel lean jets comprises the steps of:
   generating a primary fuel stream as the core of the fuel rich jet;
   generating an annular secondary oxygen stream around the primary fuel stream to generate the shroud of substantially stoichiometric combustion products at the periphery of the fuel rich jet;
   generating a plurality of primary oxygen streams around the periphery of the fuel rich jet each primary oxygen stream being a core of a fuel lean jet; and
   generating an annular secondary fuel stream around each of the primary oxygen streams to generate the shroud of substantially stoichiometric combustion products at the periphery of each of the fuel lean jets.

2. The method of claim 1 wherein the velocity of the annular secondary oxygen stream is less than the velocity of the primary fuel stream.

3. The method of claim 2 wherein the velocity of the secondary oxygen stream is less than approximately 70% of the velocity of the primary fuel stream.

4. The method of claim 1 wherein the velocity of each of the secondary fuel streams is less than the velocity of the primary oxygen streams.

5. The method of claim 4 wherein the velocity of each of the secondary fuel streams is less than approximately 70% of the velocity of the primary oxygen streams.

6. The method of claim 1 wherein the velocity of the primary fuel stream and the velocity of each of the primary oxygen streams are approximately equal.

7. The method of claim 1 wherein the velocity of the secondary oxygen stream and the velocity of each of the secondary fuel streams are approximately equal.

8. The method of claim 1 further comprising the step of diverting a portion of the primary fuel stream to generate a lower velocity fuel stream between the primary fuel stream and the secondary oxygen stream.

9. The method of claim 1 further comprising the step of diverting a portion of each of the primary oxygen streams to generate a lower velocity oxygen stream between each of the primary oxygen streams and the secondary fuel stream.

10. The method of claim 1 wherein the axis of at least one of the fuel lean jets diverges from the axis of the fuel rich jet by a divergence angle.

11. The method of claim 10 wherein the divergence angle is less than approximately 10 degrees.

12. The method of claim 10 wherein velocity of the divergent jet is less than the velocity of the non-diverging jet.

13. The method of claim 1 further comprising the step of directing the substantially parallel fuel rich and fuel lean jets into a cavity.

14. The method of claim 13 wherein the axis of the cavity diverges from the axis of the primary fuel stream by a cavity divergence angle.

15. The method of claim 14 wherein the cavity divergence angle is less than approximately 20 degrees.

16. The method of claim 1 wherein the adiabatic temperature of the fuel rich and fuel lean jets is at least 800° C.

17. A method for heating a surface susceptible to oxidation or reduction comprising the steps of:
   generating substantially parallel fuel rich and fuel lean jets, each jet having a shroud of substantially stoichiometric combustion products to minimize mixing between the substantially parallel fuel rich and fuel lean jets; and
   contacting said surface with said substantially parallel fuel rich and fuel lean jets thereby forming a flame at or near said surface;
   wherein said step of generating substantially parallel fuel rich and fuel lean jets comprises the steps of:
   generating a primary fuel stream as the core of the fuel rich jet;
   generating an annular secondary oxygen stream around the primary fuel stream to generate the shroud of substantially stoichiometric combustion products at the periphery of the fuel rich jet;

generating an annular primary oxygen stream around the periphery of the fuel rich jet as the core of the fuel lean jet; and generating an annular secondary fuel stream around the periphery of the primary oxygen stream to generate the shroud of substantially stoichiometric combustion products at the periphery of the fuel lean jet.

18. The method of claim 17 wherein the velocity of the annular secondary oxygen stream is less than the velocity of the primary fuel stream.

19. The method of claim 18 wherein the velocity of the secondary oxygen stream is less than approximately 70% of the velocity of the primary fuel stream.

20. The method of claim 17 wherein the velocity of the secondary fuel streams is less than the velocity of the primary oxygen stream.

21. The method of claim 20 wherein the velocity of the secondary fuel stream is less than approximately 70% of the velocity of the primary oxygen stream.

22. The method of claim 17 wherein the velocity of the primary fuel stream and the velocity of the primary oxygen streams are approximately equal.

23. The method of claim 17 wherein the velocity of the secondary, oxygen stream and the velocity of the secondary fuel streams are approximately equal.

24. The method of claim 17 further comprising the step of diverting a portion of the primary fuel stream to generate a lower velocity fuel stream between the primary fuel stream and the secondary oxygen stream.

25. The method of claim 17 further comprising the step of diverting a portion of the primary oxygen streams to generate a lower velocity oxygen stream between the primary oxygen stream and the secondary fuel stream.

26. A method for heating a surface susceptible to oxidation or reduction comprising the steps of:

generating substantially parallel fuel rich and fuel lean jets, each jet having a shroud of substantially stoichiometric combustion products to minimize mixing between the substantially parallel fuel rich and fuel lean jets; and contacting said surface with said substantially parallel fuel rich and fuel lean jets thereby forming a flame at or near said surface;

wherein said step of generating substantially parallel fuel rich and fuel lean jets comprises the steps of:

generating a primary oxygen stream as the core of a fuel lean jet;

generating an annular secondary fuel stream around the primary oxygen stream to generate a shroud of substantially stoichiometric combustion products at the periphery of the fuel lean jet;

generating a plurality of primary fuel streams as the core of a plurality of fuel rich jets around the periphery of the fuel lean jet; and generating an annular secondary oxygen stream around each of the primary fuel streams to generate a shroud of substantially stoichiometric combustion products at the periphery of each of the fuel rich jets.

27. The method of claim 26 wherein the velocity of the annular secondary fuel stream is less than the velocity of the primary oxygen stream.

28. The method of claim 27 wherein the velocity of the secondary fuel stream is less than approximately 70% of the velocity of the primary oxygen stream.

29. The method of claim 26 wherein the velocity of each of the secondary oxygen streams is less than the velocity of the primary fuel streams.

30. The method of claim 29 wherein the velocity of each of the secondary oxygen streams is less than approximately 70% of the velocity of the primary fuel streams.

31. The method of claim 26 wherein the velocity of the primary oxygen stream and the velocity of each of the primary fuel streams are approximately equal.

32. The method of claim 26 wherein the velocity of the secondary fuel stream and the velocity of each of the secondary oxygen streams are approximately equal.

33. The method of claim 26 further comprising the step of diverting a portion of the primary oxygen stream to generate a lower velocity oxygen stream between the primary oxygen stream and the secondary fuel stream.

34. The method of claim 26 further comprising the step of diverting a portion of each of the primary fuel streams to generate a lower velocity fuel stream between the primary fuel stream and the secondary oxygen stream.

35. A method for heating a surface susceptible to oxidation or reduction comprising the steps of:

generating substantially parallel fuel rich and fuel lean jets, each it having a shroud of substantially stoichiometric combustion products to minimize mixing between the substantially parallel fuel rich and fuel lean jets; and contacting said surface with said substantially parallel fuel rich and fuel lean jets thereby forming a flame at or near said surface;

wherein said step of generating substantially parallel fuel rich and fuel lean jets comprises the steps of:

generating a primary oxygen stream as the core of the fuel lean jet;

generating an annular secondary fuel stream around the primary oxygen stream to generate a shroud of substantially stoichiometric combustion products at the periphery of the fuel lean jet;

generating an annular primary fuel stream as the core of the fuel rich jet around the periphery of the fuel lean jet; and generating an annular secondary oxygen stream around the periphery of the annular primary fuel stream to generate a shroud of substantially stoichiometric combustion products at the periphery of the fuel rich jet.

36. The method of claim 35 wherein the velocity of the annular secondary fuel stream is less than the velocity of the primary oxygen stream.

37. The method of claim 36 wherein the velocity of the secondary fuel stream is less than approximately 70% of the velocity of the primary oxygen stream.

38. The method of claim 35 wherein the velocity of the secondary oxygen streams is less than the velocity of the primary fuel stream.

39. The method of claim 38 wherein the velocity of the secondary oxygen stream is less than approximately 70% of the velocity of the primary fuel stream.

40. The method of claim 35 wherein the velocity of the primary oxygen stream and the velocity of the primary fuel streams are approximately equal.

41. The method of claim 35 wherein the velocity of the secondary fuel stream and the velocity of the secondary oxygen streams are approximately equal.

42. The method of claim 35 further comprising the step of diverting a portion of the primary oxygen stream to generate a lower velocity oxygen stream between the primary oxygen stream and the secondary fuel stream.

43. The method of claim 35 further comprising the step of diverting a portion of the primary fuel streams to generate a lower velocity fuel stream between the primary fuel stream and the secondary oxygen stream.

* * * * *